(12) United States Patent
Park et al.

(10) Patent No.: US 9,277,027 B2
(45) Date of Patent: Mar. 1, 2016

(54) METHOD FOR PROVIDING MESSAGE AND DEVICE THEREFOR

(75) Inventors: Ho-Yeon Park, Seoul (KR); Young-Wan So, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 13/094,197

(22) Filed: Apr. 26, 2011

(65) Prior Publication Data

US 2011/0264753 A1    Oct. 27, 2011

(30) Foreign Application Priority Data

Apr. 26, 2010  (KR) .................. 10-2010-0038713

(51) Int. Cl.
- *G06F 15/16* (2006.01)
- *H04L 29/08* (2006.01)
- *H04L 12/24* (2006.01)

(52) U.S. Cl.
CPC ............ *H04L 67/303* (2013.01); *H04L 67/025* (2013.01); *H04L 67/36* (2013.01); *H04L 41/22* (2013.01)

(58) Field of Classification Search
CPC .................. H04L 29/06095; H04L 29/12188; H04L 51/38; H04L 67/16; H04W 80/04
USPC .......................... 709/201, 202, 203, 204, 206
See application file for complete search history.

(56) References Cited

U.S. PATENT DOCUMENTS

| | | | |
|---|---|---|---|
| 6,147,601 A * | 11/2000 | Sandelman | F24F 11/0086 340/12.53 |
| 6,885,861 B2 * | 4/2005 | Koskelainen | H04W 24/04 455/414.2 |
| 7,349,967 B2 | 3/2008 | Wang | |
| 7,583,686 B2 | 9/2009 | Shitano et al. | |
| 7,792,928 B2 * | 9/2010 | Abujbara | G06F 9/468 709/219 |
| 2003/0009537 A1 | 1/2003 | Wang | |
| 2007/0118586 A1 * | 5/2007 | Hwang | H04H 60/72 709/200 |
| 2008/0028211 A1 * | 1/2008 | Tanizawa | H04L 63/065 713/163 |
| 2008/0040351 A1 | 2/2008 | Jin et al. | |
| 2008/0051118 A1 | 2/2008 | Shin | |
| 2008/0250149 A1 * | 10/2008 | Morris | H04L 67/24 709/229 |
| 2009/0193438 A1 * | 7/2009 | Jin | H04L 719/318 719/318 |

FOREIGN PATENT DOCUMENTS

| | | |
|---|---|---|
| CN | 1443353 A | 9/2003 |
| JP | 2005-311773 A | 11/2005 |
| KR | 10-2001-0111093 A | 12/2001 |
| KR | 10-0679010 B1 | 2/2007 |
| KR | 10-0782854 B1 | 12/2007 |
| KR | 10-2009-0123474 A | 12/2009 |

* cited by examiner

*Primary Examiner* — Dhairya A Patel
(74) *Attorney, Agent, or Firm* — Jefferson IP Law, LLP (57) ABSTRACT

A method and device for providing a message in a remote User Interface (UI) system are provided. The method includes, if a notification message to be sent to a second device connected to a first device is generated in a remote server or the first device communicating with the remote server, the first device generates access information to the notification message, includes the access information in a notification message event indicating occurrence of the notification message, and sends the notification message event to a plurality of second devices in a multicast transmission. Upon receiving a request for the notification message from the plurality of second devices, the first device sends the notification message to the second device whose IDentifier (ID) is identical to a device ID included in the access information, among the plurality of second devices.

12 Claims, 8 Drawing Sheets

| | |
|---|---|
| Boolean sendMulticastNotif (Integer remoteDeviceHandle, Integer eventLevel, String notifCEHTML, String friendlyName, String profilelist ) | |
| Description | Send the 3rd party multicast notification to any Remote Devices (as defined in Section 5.6.1 of CEA-2014-A) based on target Remote Device information.<br><br>The OITF SHALL store the text (essentially a CE-HTML document) provided in the notifCEHTML parameter inside the DLNA RUIS and SHALL create a URL to it which can be used by Remote Devices to retrieve the original text. This URL SHALL be inserted in the <ruiEventURL> element in the Multicast Notification Message. If the notifCEHTML parameter is set to null, the HTTP request from the Remote Device to retrieve the text SHALL be being pended and dispatch the onResultMuticastNotif event to the DAE application which will retrieve a CE-HTML document dynamically. The DAE application SHALL use the sendRemoteMessage method with a CE-HTML document related parameters to send the text (notification message).<br><br>If the remoteDeviceHandle parameter in this method has a value other than -1, the notification CE-HTML document will be retrieved by the only Remote Device matched with the remoteDeviceHandle parameter, whereas if the parameter has -1, all of the Remote Devices could retrieve the notification CE-HTML from the OITF (see 7.17.1.5.5).<br><br>This method SHALL return true if the operation succeeded, or false if it failed. |
| Arguments | remoteDeviceHandle — The handle of the Remote Device |
| Arguments | eventLevel — The value of the HTTP LVL. This allows the Remote Devices to filter the multicast notification messages. The following are the defined event levels and the expected meaning of those values (see Section 5.6.1 of CEA-2014-A for more information): |

| Status | Semantics |
|---|---|
| 0 | The "upnp:/emergency" is included in the <ruiEventURL> of the multicast notification.<br><br>The event carries critical information that the Remote Device should act upon immediately. |
| 1 | The "upnp:/fault" is included in the <ruiEventURL> of the multicast notification.<br><br>The event carries information related to an error case |

FIG.5A

| | | 2 | The "upnp:/warning" is included in the <ruiEventURL> of the multicast notification.<br><br>The event carries information that is a non-critical condition that the Remote Device may want to process or pass to the user. |
|---|---|---|---|
| | | 3 | The "upnp:/info" is included in the <ruiEventURL> of the multicast notification.<br><br>The event caries informational contents that is not part of the main service interaction but may be useful to some Remote Devices in some circumstances, such as debugging information or other data. |
| | | 4 | The "upnp:/general" is included in the <ruiEventURL> of the multicast notification.<br><br>For events that fit into no other defined category. |
| Arguments | notifCEHTML | The text that makes up the notification CE-HTML document, the link to which is sent to the Remote Device. | |
| Arguments | friendlyName | A human readable name for this notification. | |
| Arguments | profilelist | All the profiles that the Remote UI Server in the OITF requires the Remote UI Client in the Remote Device to support to properly render the notification CE-HTML document. The value of the <profilelist>-element SHALL conform to the definition of the <profilelist>-element in the XML schema in Annex B of [CEA-2014-A]. | |

FIG.5B 7.17.1.5.5 Notification to the Remote Device

The application/oipfRemoteControlFunction object supports generating 3rd party multicast notifications and dispatching them to Remote Devices. The DAE application can make and send a notification to the Remote Devices by using the sendMulticastNotif method.

Below is example source code to show that all of the Remote Devices retrieve the notification CE-HTML document.

```
Var remoteDeviceHandle = -1;
var eventLevel = 0;
var notifCEHTML = "<html>,,,</html>";
var friendlyName = "Important notification";
var profilelist = "<ui_profile name='MD_UIPROF'/>";
sendMulticastNotif (remoteDeviceHandle, eventLevel, notifCEHTML, friendlyName,
profilelist);
```

If the DAE application wants to allow only targeted Remote Device (currently being connected to the DAE application) to retrieve the notification CE-HTML document, the DAE application set the the proper remoteDeviceHandle parameter in sendMulticastNotif method when it calls. Then, the OITF SHALL generate the notification URI with devicehandle and daeid parameters.

If the DAE application wants to send a notification CE-HTML document without storing it in the OITF, the DAE application executes the sendMulticastNotif method with null value in the notifCEHTML parameter. The OITF SHALL make the notification URI which contains a dynamic parameter with true value, otherwise false is set in the dynamic parameter.

Below is a generated notification URI based on parameter information in the sendMulticastNotif method.

- ?SendToTargetedRD&devicehandle=<target device handle value>&daeid=
  <DAE App ID>&dynamic=<true or false>

This URL is sent to the Remote Devices through the <ruiEventURL> element of the multicast notification event and then the Remote Devices send requests to the OITF with this URL upon receiving it. When the OITF receives the requests from the Remote Devices, it SHALL return the notification CE-HTML document in case the handle of the Remote Device which sends the request is the same with the parameter value "<target device handle value>" in the HTTP request URL, otherwise the OITF SHALL return the HTTP 500 response.

Below is example source code to show that the only targeted Remote Device retrieves the notification CE-HTML document.

```
var remoteDeviceHandle = 13;
var eventLevel = 0;
var notifCEHTML = null;
var friendlyName = "Important notification";
var profilelist = "<ui_profile name='MD_UIPROF'/>";
sendMulticastNotif (remoteDeviceHandle , eventLevel, notifCEHTML, friendlyName,
profilelist);
```

After the Multicast Notification Message is made by the OITF, it will be sent to all of the Remote Device in the Home Area Network. Then, Remote Devices send the HTTP request to retrieve the notification CE-HTML document. When the OITF receives this HTTP request which contains the devicehandle parameter in the URL, the OITF responds the notification CE-HTML document to the Remote Device.

FIG.6

| function onResultMuticastNotif ( Integer remoteDeviceHandle, Integer reqHandle, Boolean dynamic |
|---|
| The function that is called when the OITF sends a response message containing the notification CE-HTML document.

When this event is invoked with true value in the dynamic parameter, the DAE application SHALL respond by calling the sendRemoteMessage method. This method need not be called from the event handling function, and may be called after a request to the IPTV Applications Server for an appropriate notification CE-HTML document has completed. |

FIG.7

METHOD FOR PROVIDING MESSAGE AND DEVICE THEREFOR

PRIORITY

This application claims the benefit under 35 U.S.C. §119 (a) of a Korean patent application filed in the Korean Intellectual Property Office on Apr. 26, 2010 and assigned Serial No. 10-2010-0038713, the entire disclosure of which is hereby incorporated by reference.

BACKGROUND OF THE INVENTION

1. Field of the Invention

The present invention relates to a method for providing messages and a device therefor. More particularly, the present invention relates to a method for providing messages to a third device in a remote User Interface (UI) system using a remote UI, and a device therefor.

2. Description of the Related Art

Many studies have been made to improve home network technologies by many industry standard organizations, such as Digital Living Network Alliance (DLNA), Home Audio-Video Interoperability (HAVi), and Universal Plug and Play (UPnP).

In a home network, Remote User Interface (RUI) technology may be used to allow one device to control features of other devices. In the RUI technology based on the client-server architecture, an RUI client fetches a User Interface (UI) from an RUI server and allows its user to control the RUI server using the UI on the RUI client. The RUI will be referred to as a remote UI, and the RUI server will be referred to as a remote server.

Figure 1:
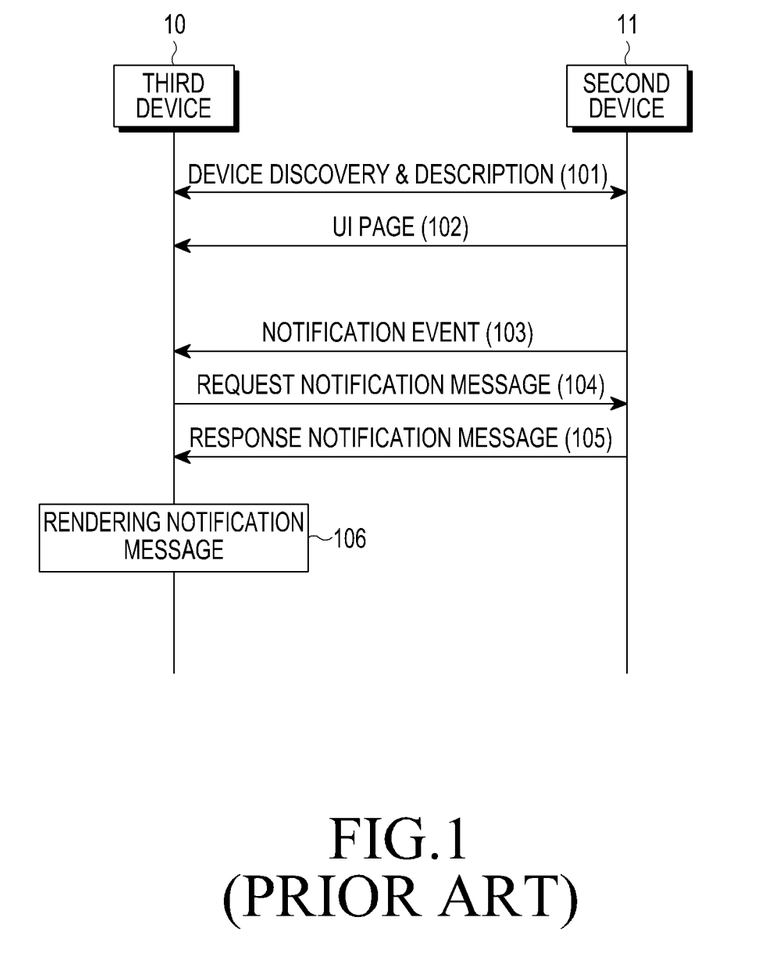
FIG. 1 is a signaling diagram illustrating a process of providing a notification message in a network according to the prior art.

FIG. 1 is a signaling diagram illustrating a process of providing a notification message in a network according to the prior art.

Referring to FIG. 1, a third device 10 receives a notification message from a second device 11. The third device 10 corresponds to an RUI client, and the second device 11 corresponds to another device with an embedded server, which may provide a remote UI upon request of the third device 10. The third device 10 discovers the second device 11 in step 101, and receives a UI page provided by the second device 11 in step 102.

Thereafter, if the second device 11 sends a message indicating occurrence of a notification message to the third device 10 in a multicast transmission in step 103, the third device 10 requests the second device 11 to send a notification message to be shown to its user, in step 104. Thereafter, the second device 11 sends the requested notification message to the third device 10 in step 105, and the third device 10 renders the notification message and displays it on a screen in step 106.

In the related art, because the second device 11 sends the notification event information to all of the third devices 10 in home in a multicast transmission in step 103, the second device 11 may not send the related message only to a specific third device. Therefore, in order to send a message to a specific third device, the second device 11 needs to first provide a UI page, and using an address and its associated information of the second device 11, which are included in the UI page, the third device 10 may request for the second device 11 to send a notification message.

However, in the remote control environment where the second device is connected to a remote server (not shown) and a UI page is provided from the remote server to the third device via the second device, there is no way that the second device may directly forward a notification message to a specific third device, because an address of the second device, from which the notification message may be received, is not included in the UI page provided from the remote server. In this case, use of the existing message delivery schemes like a Transmission Control Protocol (TCP) socket, and polling is impossible, and use of eXtensible Markup Language (XML) HyperText Transfer Protocol (HTTP) Request (XHR) is also inconvenient.

Therefore, a need exists for a message providing method capable of sending a notification message to a specific device in a remote control environment including at least three entities, and a device therefor.

SUMMARY OF THE INVENTION

Aspects of the present invention are to address at least the above-mentioned problems and/or disadvantages and to provide at least the advantages described below. Accordingly, an aspect of the present invention is to provide a message providing method capable of sending a notification message to a specific device in a remote control environment including at least three entities, and a device therefor.

Another aspect of the present invention is to provide a message providing method for efficiently providing a notification message in a remote control environment including at least three entities, and a device therefor.

Another aspect of the present invention is to provide a message providing method for efficiently providing a notification message through communication between devices and a remote server in a network, and a device therefor.

Another aspect of the present invention is to provide a message providing method for sending a notification message event to a plurality of devices in a multicast transmission and providing a notification message to only a specific device among the plurality of devices in a network, and a device therefor.

In accordance with an aspect of the present invention, a method for providing a message in a remote User Interface (UI) system is provided. The method includes, if a notification message to be sent to a second device connected to a first device is generated in a remote server or the first device communicating with the remote server, the first device generates access information to the notification message, includes the access information in a notification message event indicating occurrence of the notification message, sends the notification message event to a plurality of second devices in a multicast transmission, and upon receiving a request for the notification message from the plurality of second devices, the first device sends the notification message to the second device whose IDentifier (ID) is identical to a device ID included in the access information, among the plurality of second devices.

In accordance with another aspect of the present invention, a device for providing a message in a remote UI system is provided. The device includes an application communicating with a remote server, for receiving a notification message from the remote server or for generating a notification message, and for sending the received or generated notification message to a third device presently connected to the device, a handler for generating access information to the notification message, for including the access information in a notification message event indicating occurrence of the notification message, and for sending the notification message event to a plurality of third devices in a multicast transmission, and an embedded server for receiving the notification message from the application, and for sending the notification message to the third device whose ID is identical to a device ID included in the access information, among the plurality of third devices, upon receiving a request for the notification message from the plurality of third devices.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 5A through 7 are diagrams illustrating notification message applicability in an Open Internet Protocol TeleVision (IPTV) Forum standard according to exemplary embodiments of the present invention.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In the following description, a device requesting a User Interface (UI) page will be referred to as a third device, and a device that provides a UI page and a notification message to the third device over a remote server will be referred to as a second device.

Exemplary embodiments of the present invention provide a new scheme, in which a second device provides a notification message generated in the second device itself to the third device, and when connected to a remote server, the second device provides a notification message generated in the remote server to the third device.

In addition, exemplary embodiments of the present invention provide a new scheme, in which a notification message event generated in a second device and a notification message event generated in a remote server are provided to a plurality of third devices in a multicast transmission, and upon receiving a request for a notification message from the plurality of the third devices, the notification message is provided only to an intended third device.

FIGS. 2 through 7, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Figure 2:
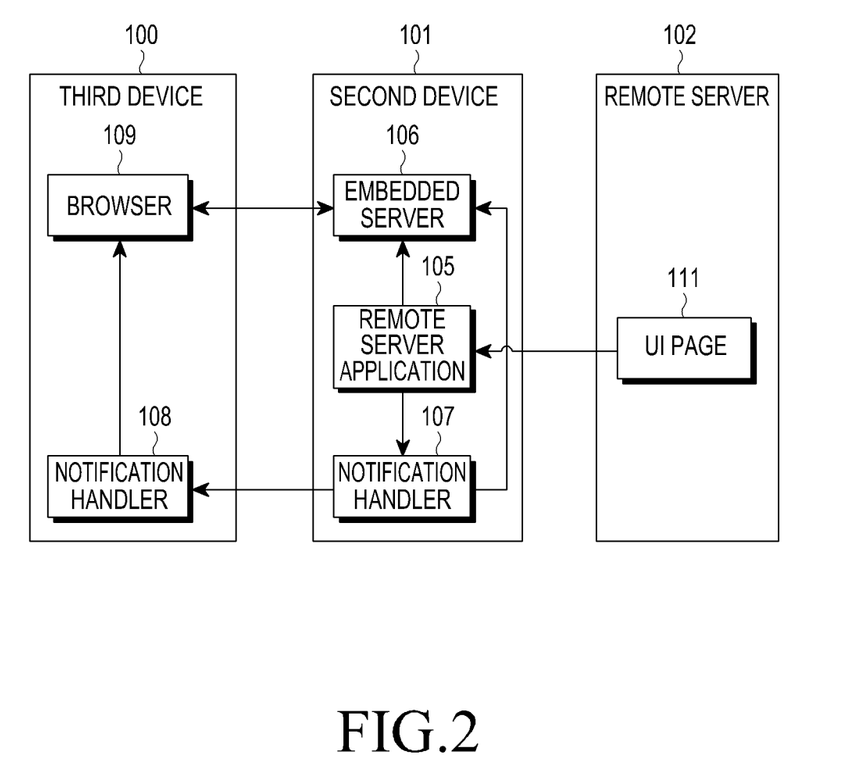
FIG. 2 is a diagram illustrating a configuration of a message delivery system according to an exemplary embodiment of the present invention.

FIG. 2 is a diagram illustrating a configuration of a message delivery system according to an exemplary embodiment of the present invention.

Referring to FIG. 2, a message delivery system includes a third device 100, a second device 101, and a remote server 102.

The third device 100, corresponding to a Remote User Interface (RUI) client, discovers the second device 101, receives description information of the second device 101, requests the second device 101 to provide a UI page, and renders and displays the UI page received upon the request.

The third device 100 receives a notification message event indicating occurrence of a notification message, which was generated in the second device 101 itself or generated in the remote server 102, through the second device 101 in a multicast transmission, and receives a notification message to be shown to its user from the second device 101 through the received notification message event.

The third device 100 extracts Uniform Resource Locator (URL) information, or notification message access information, from the notification message event received from the second device 101, and requests the second device 101 to provide the notification message using the extracted URL information.

The second device 101 provides the third device 100 with a UI page provided by the remote server 102, and sends a notification message generated in the second device 101 itself or a notification message generated in the remote server 102, to the third device 100.

The second device 101 may include a remote server application 105, an embedded server 106, and a notification handler 107. The third device 100 may include a browser 109 and a notification handler 108.

The remote server application 105 receives a notification message generated in the remote server 102 or a notification message generated in the second device 101 itself, and sends the received notification message to the embedded server 106.

In accordance with an exemplary embodiment of the present invention, the second device 101 may include a plurality of remote server applications, and the remote server applications may be stored in the embedded server 106 independently according to the types of the generated notification messages.

Upon a dynamic message request, the remote server application 105 requests the remote server 102 to provide a notification message, and sends the notification message received in answer to the request, to the embedded server 106.

The 'dynamic message request' as used herein refers to an operation in which when the notification message received from the remote server 102 is not in the form of TEXT or Hypertext Markup Language (HTML), but is in the form of, for example, a URL or includes information instructing to dynamically take the notification message, the remote server application 105 re-requests the remote server 102 to provide a notification message in the form of TEXT or HTML.

The embedded server 106 may provide description information about the second device 101, based on which the third device 100 may discover the second device 101 and request the second device 102 to provide a UI page.

The embedded server 106 stores information about the third device 100 each time the third device 100 receives a UI page from the remote server 102 through the second device 101.

Upon receiving a notification message from the remote server application 105, the embedded server 106 stores the received notification message and a remote server application having sent the notification message. If the received notification message is in the form of TEXT, the embedded server 106 stores the notification message after converting it into an HTML format displayable on the third device 100. If the received notification message is in the form of HTML, the embedded server 106 stores the notification message without conversion.

If the notification message received from the remote server application 105 is not in the form of TEXT or HTML, but is in the form of, for example, a URL or includes dynamic message request information, the embedded server 106 does not store the notification message.

The embedded server 106 sends parameter values including a remote server application ID (information about an associated remote server application), a device ID (information about the third device), and dynamic message information, to the notification handler 107 so that the notification handler 107 may generate the URL information, or access information for the notification message.

Upon receiving requests for a notification message from a plurality of the third devices, the embedded server 106 sends the notification message only to an intended specific third device 100 using a Hypertext Transport Protocol (HTTP) response message. As the plurality of the third devices request a notification message using the same URL information, the embedded server 106 may determine (or select) the intended specific third device 100 whose information is identical to information (a device ID) about the third device, which may be included in the URL information, among the plurality of the third devices.

The URL information is information extracted from a notification message event that the notification handler 107 has sent in a multicast transmission to inform the plurality of the third devices of occurrence of the notification message.

The embedded server 106 sends an appropriate Null response or an error message to the third devices whose device IDs are not identical to the information (device ID) about the third device, included in the URL information, among the plurality of the third devices. The embedded server 106 sends an HTTP response message with a separate new HTTP response code or a specific parameter value inserted in it, to the third devices having non-identical device IDs. The separate new HTTP response code is defined to prevent any error message or window from being generated and shown to users, and the specific parameter value is provided so that a notification handler in each of the third devices having non-identical device IDs does not respond to a request.

The embedded server 106 analyzes URL information received from the plurality of the third devices to determine if a request for a dynamic message is present. If so, the embedded server 106 sends an event message indicating the dynamic message request to the remote server application 105, and sends a notification message in the form of TEXT or HTML, received from the remote server application 105, to the intended specific third device 100. The embedded server 106 converts the notification message in the form of TEXT into a notification message in the form of HTML, and sends it to the intended specific third device 100.

Upon receiving parameter values including remote server application information (a remote sever application ID), third device information (a device ID), and dynamic message information from the embedded server 106, the notification handler 107 generates the URL information or access information to the notification message, using the parameter values, and sends a notification message event including the URL information to the plurality of the third devices in a multicast transmission.

The remote server 102 has a UI page 111 representing a UI that can be rendered on the third device 100, and provides the UI page 111 and the notification message to the third device 100 through the second device 101 connected to the remote server 102.

A process of providing a message over the message delivery system illustrated in FIG. 2 will be described with reference to FIGS. 3 and 4.

Figure 3:
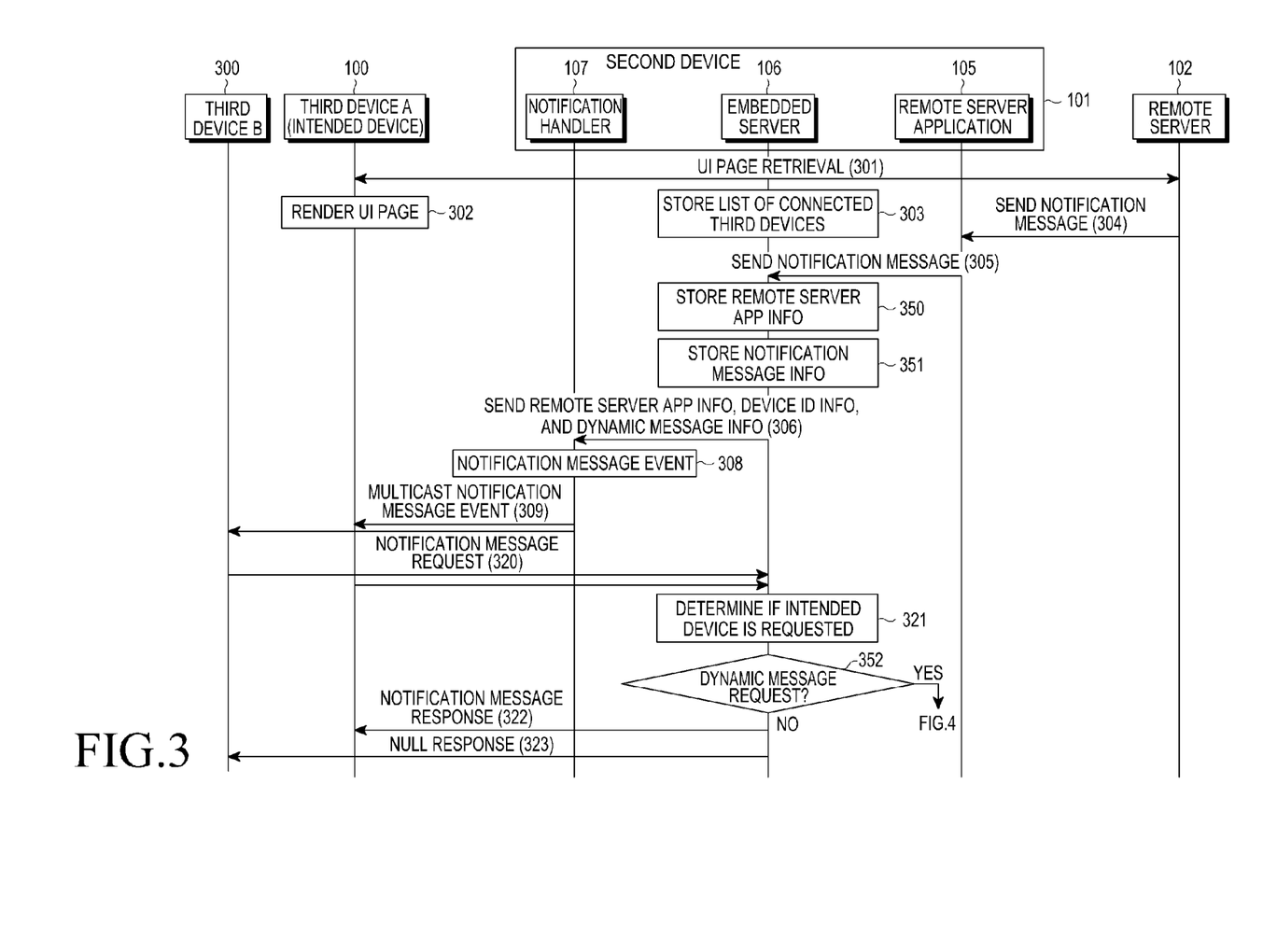
FIG. 3 is a signaling diagram illustrating a process of providing a notification message in a network according to an exemplary embodiment of the present invention.

FIG. 3 is a signaling diagram illustrating a process of providing a notification message in a network according to an exemplary embodiment of the present invention.

Referring to FIG. 3, in step 301, if a third device A 100 discovers the second device 101, receives description information of the second device 101, and requests the second device 101 to provide a UI page, the second device 101 sends a UI page provided by the remote server 102 to the third device A 100. In step 302, the third device A 100 renders the received UI page and displays it on a web browser.

In step 303, the embedded server 106 in the second device 101 stores information about the third device A 100 each time the third device A 100 receives a UI page from the remote server 102.

If a notification message is generated in the second device 101, or if an event occurs and its associated notification message is generated in a device controlled by the remote server 102, the generated notification message is sent to the remote server application 105 in the second device 101 in step 304.

In step 305, the remote server application 105 sends the notification message to the embedded server 106. In step 350, the embedded server 106 stores information (a remote server application ID) about the remote server application 105 that sent the notification message.

Table 1 below shows the notification message event including the URL information, or access information to the notification message.

TABLE 1

NOTIFY delivery path HTTP/1.1
HOST: 239.255.255.246:<7900>
CONTENT-TYPE: text/xml; charset="utf-8"
CONTENT-LENGTH: bytes in body
USN: uuid:device-UUID::urn:schemas-upnp-org:device:RemoteUIServerDevice:1
    (or for Level 1 RUI server: device-UUID:urn:schemas-ce-
org:device:RemoteUIServerDevice:1)
SvcID: urn:upnp-org:serviceId:RemoteUIServer1
    (or for Level 1 RUI server: urn:ce-org:serviceId:RemoteUIServer1)
NT: upnp:event
NTS: upnp:propchange
SEQ: monotonically increasing sequential ID
LVL: event importance level
BOOTID.UPNP.ORG: number increased each time device sends an initial
announcement
[Blank line]
<?xml version="1.0"?>
<e:propertyset xmlns="urn:schemas-upnp-org:device-1-0"
    xmlns:e="urn:schemas-upnp-org:event-1-0">
<e:property>
    <ruiEventURL>New Notification URL</ruiEventURL>
</e:property>
<e:property>
    <friendlyName>Friendly Name for the event</friendlyName>
</e:property>
<e:property>
    <profilelist><ui_profile name= "HD_UIPROF"/></profilelist>
</e:property>
</e:propertyset>

If the received notification message is in the form of TEXT, the embedded server 106 stores the notification message after converting it into the HTML format displayable on the third device A 100 in step 351. If the received notification message is in the form of HTML, the embedded server 106 stores the notification message without conversion in step 351. However, if the notification message received from the remote server application 105 is not in the form of TEXT or HTML, but is in the form of, for example, a URL or may include information about a dynamic message request, the embedded server 106 does not store the notification message.

Thereafter, in step 306, the embedded server 106 sends parameter values, based on which URL information or access information to the notification message may be generated, to the notification handler 107.

The parameter values, based on which URL information or access information to the notification message may be generated, include information (a remote server application ID) about the remote server application, information (a device ID) about the third device, and dynamic message information. The 'dynamic message request' as used herein refers to an operation in which when the notification message received from the remote server 102 is not in the form of TEXT or HTML, but is in the form of, for example, a URL or may include information instructing to dynamically take the notification message, the remote server application 105 re-requests the remote server 102 to provide a notification message in the form of TEXT or HTML.

Having received the parameter values from the embedded server 106, the notification handler 107 generates the URL information, or access information to the notification message, using the parameter values, and generates a notification message event including the URL information in step 308.

In step 309, the notification handler 107 sends the generated notification message event to a plurality of the third devices A 100 and B 300 in home in a multicast transmission.

In the notification message event of Table 1, the URL information may be included in an element <ruiEventURL>, and an example of the URL information is as shown in Table 2 below.

TABLE 2 http://192.168.2.1/noti_message?appid=123&userdevice=32&dynamic=Y

In Table 2, an identifier "appid" is an identifier indicating a remote server application having delivered the notification message, among a plurality of remote server applications running the second device 101.

An identifier "userdevice" is an identifier indicating an intended third device 100, to which the notification message needs to be delivered, among a plurality of the third devices.

An identifier "dynamic" is an identifier for identifying a dynamic message request. In step 351, a value of the identifier "dynamic" is set as "N" if user data stored in the embedded server 106 is in the form of HTML, and a value of the identifier "dynamic" is set as "Y" if user data stored in the embedded server 106 is not in the form of HTML.

The plurality of the third devices A 100 and B 300 having received the above notification message event in a multicast transmission extract only the URL information defined in Table 2 from the notification message event, and request the second device 101 to provide a notification message using the URL information in step 320.

Upon receiving the requests for a notification message from the plurality of the third devices A 100 and B 300 based on the URL information, the embedded server 106 in the second device 101 determines in step 321 whether the third device whose information (ID) is identical to a value of the identifier "userdevice" included in the URL information, among the plurality of the third devices A 100 and B 300, as an intended specific third device A 100, which is connected in step 301.

The embedded server 106 determines a value of the identifier "dynamic" included in the URL information in step 352. If its value is "N", the embedded server 106 sends the notification message in the form of HTML, stored in step 351, only to the intended specific third device A 100 using an HTTP response message in step 322. In addition, the embedded server 106 sends a Null response or an error message to the other non-intended third device B 300 in step 323. In addition, in step 323, the embedded server 106 may send an HTTP response message with a separate new HTTP response code or a specific parameter value inserted in it. The separate new HTTP response code is defined to prevent any error message or window from being generated and shown to users, and the specific parameter value is provided so that a notification handler in the third device B 300 does not respond to the request.

However, if it is determined in step 352 that a value of the identifier "dynamic" included in the URL information received from the plurality of the third devices A 100 and B 300 is "Y", the embedded server 106 performs the below-described dynamic message transmission procedure illustrated in FIG. 4.

Figure 4:
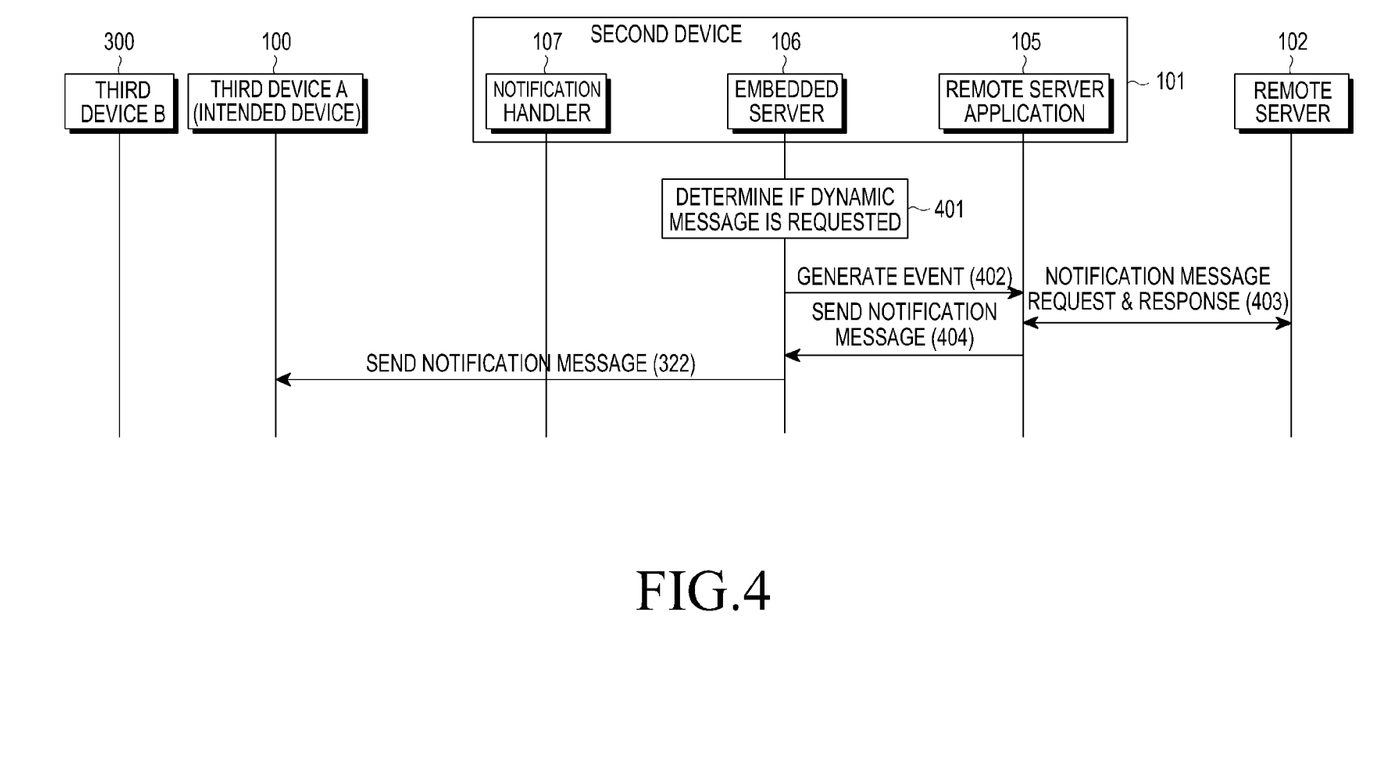
FIG. 4 is a signaling diagram illustrating a process of dynamically providing a notification message to a third device according to an exemplary embodiment of the present invention.

FIG. 4 is a signaling diagram illustrating a process of dynamically providing a notification message to a third device according to an exemplary embodiment of the present invention.

Referring to FIG. 4, if a value of the identifier "dynamic" is "Y", it denotes that the notification message received from the remote server 102 in step 304 is not in the form of TEXT or HTML, but is in the form of, for example, a URL or may include information instructing to dynamically take the notification message. Therefore, the embedded server 106 determines the presence/absence of a request for a dynamic message in step 401, and sends an event message indicating occurrence of the dynamic message request to the remote server application 105 having sent the notification message in step 402.

The remote server application 105 having received the event message requests the remote server 102 to provide a notification message having the TEXT or HTML format in step 403. Upon receiving the notification message having the TEXT or HTML format in reply to the request, the remote server application 105 sends the received notification message to the embedded server 106 in step 404.

If the received notification message is in the form of TEXT, the embedded server 106 converts the notification message into the HTML format, and sends the notification message having the HTML format to the intended specific third device A 100 in step 322.

When the message delivery is performed as above without request for the dynamic message, the processing speed for the notification message is fast, but the notification message needs to be stored as in step 351, reducing the available memory. On the contrary, if the message delivery is performed upon request for the dynamic message, the available memory may not be reduced because the memory is not used, but the processing speed may be lower compared with when the message delivery is performed without request for the dynamic message.

FIGS. 5A through 7 are diagrams illustrating notification message applicability in an Open Internet Protocol TeleVision (IPTV) Forum standard according to an exemplary embodiment of the present invention.

Figure 5B:
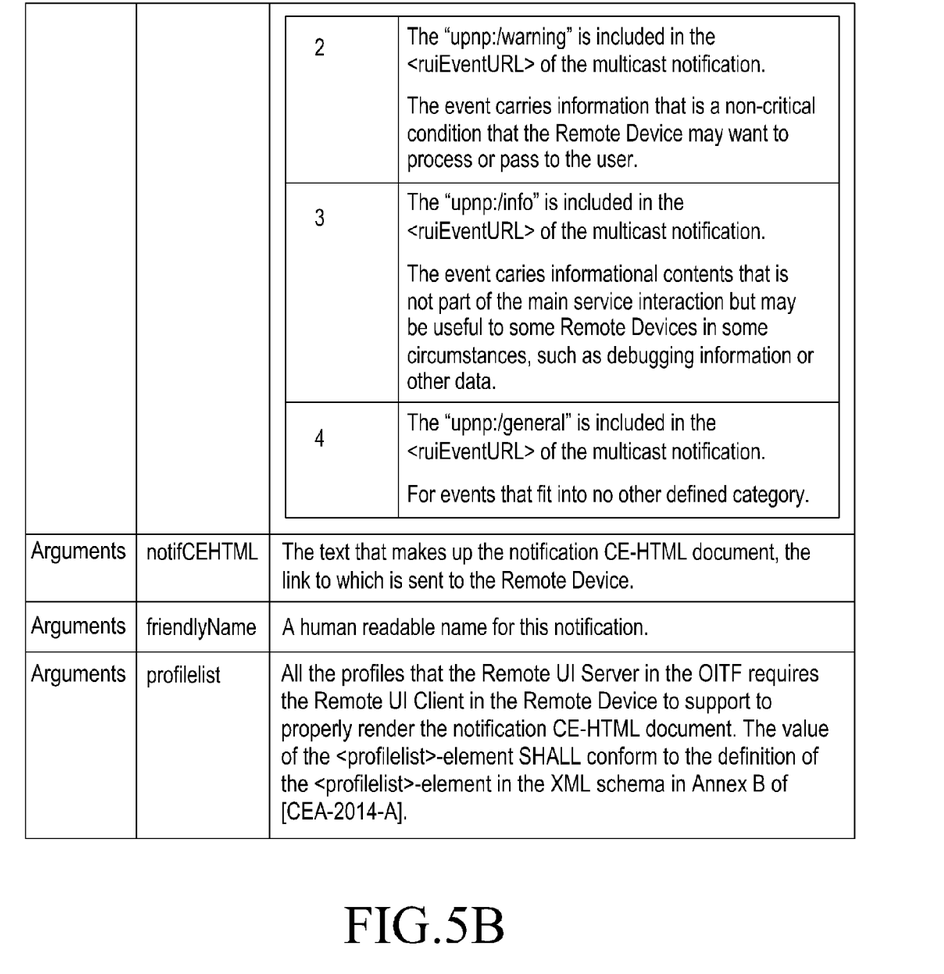

Referring to FIGS. 5A and 5B, a sendMulticastNotif method is a method that a remote server application can use to send a notification message to a specific device or all of the third devices. If a specific event occurs in the second device and the event needs to deliver a notification message only to a specific third device presently connected to the second device, the remote server application first fetches the notification message from a remote server and then sets a value fetched from a notifCEHTML parameter of the sendMulticastNotif method.

The second device inserts, into remoteDeviceHandle, an ID value of the specific third device to which it wants to send the notification message, and sets eventLevel, friendlyName, and profilelist parameters for constituting the notification event that all the third devices in a home receive. If the sendMulticastNotif method is executed after all the parameter values are set, the second device generates an ID value of the remote server application that has executed the sendMulticastNotif method, and stores the generated ID value of the remote server application in the embedded server together with the remoteDeviceHandle parameter value. A value of the notifCEHTML parameter set in the sendMulticastNotif method is also stored in the embedded server so that the third device may take it in the future, and the second device generates URL information as described with reference to FIG. 6.

The second device generates a notification message event by means of its notification handler, and sends it to all the third devices in the home in a multicast transmission.

The third devices analyze the notification message event received from the second device, extract <ruiEventURL>, and make an HTTP request to request the second device to provide a notification message using the extracted URL information.

Upon receiving the HTTP request, the second device analyzes parameter values in the HTTP request message. If an ID of the third device having made the HTTP request is identical to a 'devicehandle' value included in the HTTP request message, the second device sends the notification message stored in the embedded server to the third device using an HTTP response message.

Figure 7:
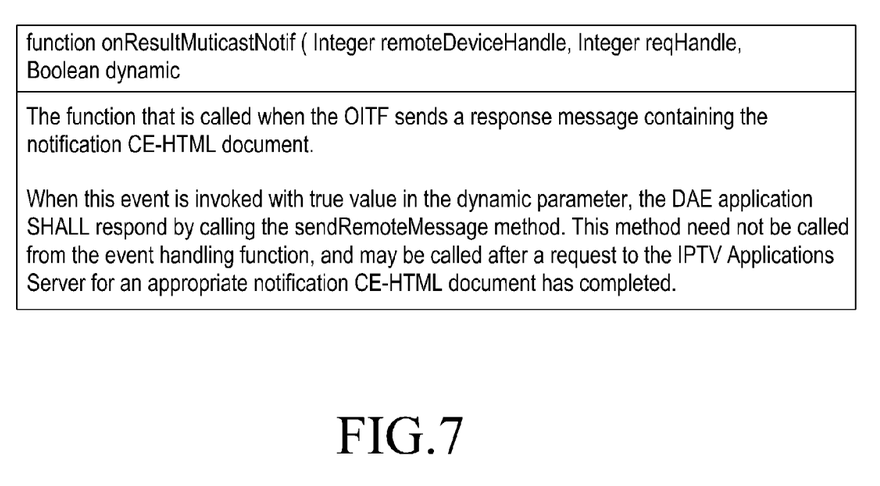

If the embedded server in the second device informs a remote server application matched to a parameter 'daeid' among the parameter values in the HTTP request message, that the stored notification message has been sent through the occurrence of an event as in FIG. 7, the remote server application may display on a screen of the second device a UI indicating that the event has been sent to the third device. By receiving the event of FIG. 7, the remote server application may take another appropriate action.

If an ID of the third device having made the HTTP request is not identical to a value of the 'devicehandle' included in the HTTP request, the second device sends an HTTP 500 error code to the third devices whose IDs are not identical to a value of the 'devicehandle'.

If the sendMulticastNotif method was executed in the state where not a value for the HTML or Text format, but a Null value was set in a notifCEHTML parameter value in the sendMulticastNotif method, no notification message is stored in the embedded server of the second device, and when a notification message request is received at the second device from the third device, the embedded server in the second device sends to the remote server application an event instructing to fetch a notification message from the remote server. The remote server application having received the event fetches a notification message from the remote server, and sends the notification message in response to the pending request from the third device.

As is apparent from the foregoing description, in the message delivery system and method of the exemplary embodiments of the present invention, one device may receive a message generated in a remote server connected to another device or a message generated in another device itself via another device through communication among devices in a network.

The message generated in the remote server or the message generated in another device itself may be sent to only a specific device.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a message in a remote User Interface (UI) system, the method comprising:
    generating, by a first device, access information for a notification message to be sent to a target device connected to the first device, wherein the notification message is generated in a remote server or the first device communicating with the remote server, the access information comprises a device handle value of the second device, the device handle value of the target device;
    sending a notification message event indicating occurrence of the notification message to at least one second device in a multicast transmission, the notification message event comprising the access information;
    receiving a request for the notification message from the at least one second device respectively using the notification message event;
    selecting a second device as the target device, when a device handle value of the second device included in the request for the notification message received therefrom is the same as the device handle value included in the access information; and
    sending, by the first device, the notification message to the selected second device.

2. The method of claim 1, wherein the access information further comprises a remote server application ID of the first device, and a dynamic parameter for dynamically retrieving the notification message.

3. The method of claim 1, wherein the sending of the notification message event to the at least one second device comprises generating the access information including a dynamic parameter for dynamically retrieving the notification message without storing the generated notification message in a form of Hypertext Markup Language (HTML), or storing the generated notification message.

4. The method of claim 3, wherein, when the access information includes the dynamic parameter, the first device dynamically retrieves a requested notification message upon receiving a request for the notification message from the second device, and sends the retrieved notification message to the second device.

5. The method of claim 1, further comprising sending a null response or an error message to the at least one second device whose device handle value is not the same with the device handle value included in the access information.

6. The method of claim 1, wherein the access information is Uniform Resource Locator (URL) information and the at least one second device respectively sends the request for the notification message to the first device with the URL information.

7. A device for providing a message in a remote User Interface (UI) system, the device comprising a non-transitory computer readable storage medium, wherein the storage medium comprises:
    an application communicating with a remote server, for receiving a notification message from the remote server or for generating a notification message, and for sending the received or generated notification message to a target device presently connected to the device;
    a handler for generating access information for the notification message, and for sending a notification message event indicating occurrence of the notification message to at least one third device in a multicast transmission, wherein the access information comprises a device handle value of the target device, and the notification message event comprises the access information; and
    an embedded server for receiving the notification message from the application, for receiving a request for the notification message from the at least one third device respectively using the notification message event, for selecting a third device as the target device, when a device handle value of the third device included in the request for the notification message received therefrom is the same as the device handle value included in the access information, and for sending the notification message to the selected third device.

8. The device of claim 7, wherein the access information further comprises an ID of the application, and a dynamic parameter for dynamically retrieving the notification message.

9. The device of claim 7, wherein the embedded server delivers a dynamic parameter for dynamically retrieving the notification message to the handler, without storing the notification message received from the application in a form of Hypertext Markup Language (HTML), or storing the received notification message; and
    wherein the handler generates the access information including the dynamic parameter.

10. The device of claim 9, wherein, when the access information includes the dynamic parameter, the embedded server dynamically retrieves a requested notification message upon receiving a request for the notification message from the third device, and sends the retrieved notification message to the third device.

11. The device of claim 7, wherein the access information is Uniform Resource Locator (URL) information and the at least one third device respectively sends the request for the notification message to the embedded server with the URL information.

12. The device of claim 7, wherein the embedded server sends a null response or an error message to the at least one third device whose device handle value is not the same with the device handle value included in the access information.

* * * * *